(12) United States Patent
Lee et al.

(10) Patent No.: US 11,942,812 B2
(45) Date of Patent: Mar. 26, 2024

(54) BATTERY CONTROL METHOD AND BATTERY SYSTEM ENABLING BATTERY CONTROL METHOD

(71) Applicants: HYUNDAI MOTOR COMPANY, Seoul (KR); KIA CORPORATION, Seoul (KR)

(72) Inventors: Hojoong Lee, Anyang-si (KR); Hyeseung Kim, Gunpo-si (KR); Youngjin Jang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 154 days.

(21) Appl. No.: 17/459,666

(22) Filed: Aug. 27, 2021

(65) Prior Publication Data

US 2022/0209543 A1 Jun. 30, 2022

(30) Foreign Application Priority Data

Dec. 31, 2020 (KR) .......................... 10-2020-0189775

(51) Int. Cl.
*H02J 7/00* (2006.01)
*B60L 53/14* (2019.01)
(Continued)

(52) U.S. Cl.
CPC .............. *H02J 7/007* (2013.01); *B60L 53/14* (2019.02); *B60L 53/20* (2019.02); *B60L 53/22* (2019.02);
(Continued)

(58) Field of Classification Search
CPC .......... H02J 7/007; H02J 7/02; H02J 2310/48; B60L 53/14; B60L 53/20; B60L 53/22; B60L 58/12
(Continued)

(56) References Cited

U.S. PATENT DOCUMENTS

2015/0306973 A1* 10/2015 Gunnerud ............... B60L 53/20
320/162
2016/0207403 A1* 7/2016 Iida ......................... B60L 58/20
(Continued)

FOREIGN PATENT DOCUMENTS

| JP | 2013-225996 A | 10/2013 |
| JP | 2020-530751 A | 10/2020 |
| WO | 2012/169023 A1 | 12/2012 |

OTHER PUBLICATIONS

European Search Report for EP App. No. 21192117 dated Jan. 27, 2022.

*Primary Examiner* — Edward Tso
*Assistant Examiner* — Aaron Piggush
(74) *Attorney, Agent, or Firm* — MCDONNELL BOEHNEN HULBERT & BERGHOFF LLP

(57) ABSTRACT

A battery system includes, a main battery, an inlet connected to an external charger through an outlet, a bidirectional on-board charger (OBC) configured to, in a charging mode, convert an AC power supplied from the external charger through the inlet to a DC power to charge the main battery, and in a discharge mode, convert a high voltage DC power discharged from the main battery to a low voltage DC power to supply the converted power to a load, and a relay configured to control an electrical connection between the bidirectional OBC and the inlet, and an electrical connection between the bidirectional OBC and the load.

5 Claims, 6 Drawing Sheets

(51) Int. Cl.
*B60L 53/20* (2019.01)
*B60L 53/22* (2019.01)
*B60L 58/12* (2019.01)
*H02J 7/02* (2016.01)

(52) U.S. Cl.
CPC .............. *B60L 58/12* (2019.02); *H02J 7/02* (2013.01); *H02J 2310/48* (2020.01)

(58) Field of Classification Search
USPC ............................... 320/104, 109, 111, 134
See application file for complete search history.

(56) References Cited

U.S. PATENT DOCUMENTS

| | | | |
|---|---|---|---|
| 2017/0320396 A1* | 11/2017 | Kim | B60L 58/12 |
| 2019/0036366 A1* | 1/2019 | Dohmeier | B60L 53/24 |
| 2019/0061553 A1* | 2/2019 | Yang | H02J 7/02 |
| 2019/0202300 A1* | 7/2019 | Pastor | H02J 7/04 |
| 2020/0086755 A1* | 3/2020 | Maruyama | B60L 53/60 |
| 2020/0209321 A1 | 7/2020 | Min | |
| 2022/0085641 A1* | 3/2022 | Hirota | B60L 50/60 |

\* cited by examiner

BATTERY CONTROL METHOD AND BATTERY SYSTEM ENABLING BATTERY CONTROL METHOD

CROSS-REFERENCE TO RELATED APPLICATION

This application claims priority to and the benefit of Korean Patent Application No. 10-2020-0189775, filed on Dec. 31, 2020, the entire contents of which are incorporated herein by reference.

TECHNICAL FIELD

The present disclosure relates to a battery control method for charging and/or discharging a battery of an electric vehicle, and a battery system enabling the battery control method.

BACKGROUND

The statements in this section merely provide background information related to the present disclosure and may not constitute prior art.

Unlike conventional internal combustion engine vehicles, environment-friendly vehicles such as electric vehicles (EVs) and hybrid vehicles (HEVs) are driven by the power of a motor by an electrical power source.

Since an environment-friendly vehicle moves with the power of the motor, the vehicle is installed with, in addition to a high voltage large capacity battery (hereinafter referred to as a main battery), a low voltage DC-DC converter (LDC) to convert the voltage of the main battery to a low voltage to charge an auxiliary battery. The auxiliary battery is a typical vehicle battery that supplies power for starting the vehicle and for various electrical components of the vehicle.

The LDC varies the voltage of the main battery to the voltage used by electrical component loads of the vehicle. In particular, when an autonomous driving function is installed in the vehicle, a separate LDC is frequently employed in order to provide sufficient electrical power appropriate for high computing power and high power-consuming electrical component loads. By employing addition LDCs, vehicle production cost is increased and spatial efficiency of the vehicle may be deteriorated.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a battery control method and a battery system enabling the battery control method, wherein a slow charger (on-board charger; OBC) having AC-DC and DC-DC bidirectional power conversion topology is configured to, in a charging mode, convert an AC power supplied from an external charger to charge a high voltage main battery, and in a discharge mode, convert a high voltage power discharged from the main battery to supply the converted power to an electrical component load related to autonomous driving.

Specifically, in charging mode, a charge path may be formed to include an inlet, a first relay, and a bidirectional OBC, and in a discharge mode, a discharge path may be formed to include the bidirectional OBC and a second relay.

A battery system may include a main battery, an inlet connected to an external charger through an outlet, a bidirectional on-board charger (OBC) configured to, in a charging mode, convert an AC power supplied from the external charger through the inlet to a DC power to charge the main battery, and in a discharge mode, convert a high voltage DC power discharged from the main battery to a low voltage DC power to supply the converted power to a load, and a relay configured to control an electrical connection between the bidirectional OBC and the inlet, or and electrical connection between the bidirectional OBC and the load.

The battery system may further include, controller configured to, in the charging mode, transfer an AC-DC power control signal instructing conversion from the AC power to the DC power to the bidirectional OBC.

The controller may be further configured to, in the discharge mode, transfer a DC-DC power control signal instructing conversion from the high voltage DC power to the low voltage DC power to the bidirectional OBC.

The controller may be further configured to, determine the charging mode when a connection signal of the inlet and a key-off signal are received, and the discharge mode is determined when a disconnection signal of the inlet and a key-on signal are received.

The relay may include a first relay connected between the inlet and a second end of the bidirectional OBC and a second relay connected between the load and the second end of the bidirectional OBC The controller may be configured to form a charge path in the charging mode, by transferring an on-level relay control signal to the first relay and an off-level relay control signal to the second relay.

The controller may be configured to form a discharge path in the discharge mode, by transferring the off-level relay control signal to the first relay and the on-level relay control signal to the second relay.

The relay may include a single pole double through (SPDT) circuit, to selectively switch an electrical connection between the bidirectional OBC and the inlet, or an electrical connection between the bidirectional OBC and the load.

The controller may be configured to form the charge path, by transferring a control signal for controlling an electrical connection between the bidirectional OBC and the inlet to the relay.

The controller may be configured to form the discharge path, by transferring a control signal for controlling an electrical connection between the bidirectional OBC and the load to the relay.

A battery control method may include, mode determining, for determine a charging mode for charging a main battery or a discharge mode for supplying a power to a load, power transfer path forming, for forming a charge path in the charging mode and forming a discharge path in the discharge mode, by controlling switching of a relay, and power transferring, where a bidirectional OBC is controlled to, in the charging mode, convert an AC power supplied from an external charger to a DC power and supply the converted DC power to the main battery through the charge path to charge the main battery, and in the discharge mode, convert a high voltage DC power discharged from the main battery to a low voltage DC power and supply the converted low voltage DC power to the load through the discharge path.

In the charging mode, the power transferring may transfer an AC-DC power control signal instructing conversion from the AC power to the DC power to the bidirectional OBC.

In the discharge mode, the power transferring may transfer a DC-DC power control signal instructing conversion from the high voltage DC power to the low voltage DC power to the bidirectional OBC.

In the mode determining, the charging mode may be determined when a key-off signal and a connection signal of an inlet connected to the external charger through an outlet are received, and the discharge mode is determined when a disconnection signal of the inlet and a key-on signal are received.

In the power transfer path forming, the relay may electrically connect the bidirectional OBC and an inlet connected to the external charger through an outlet, to form the charge path. The charge path may include the inlet, the bidirectional OBC, and the main battery.

In one form of the present disclosure, since a low voltage DC-DC converter (LDC) for supplying electrical power to an electrical component load related to autonomous driving is not separately required, reduction is manufacturing cost and decrease of vehicle weight may be achieved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
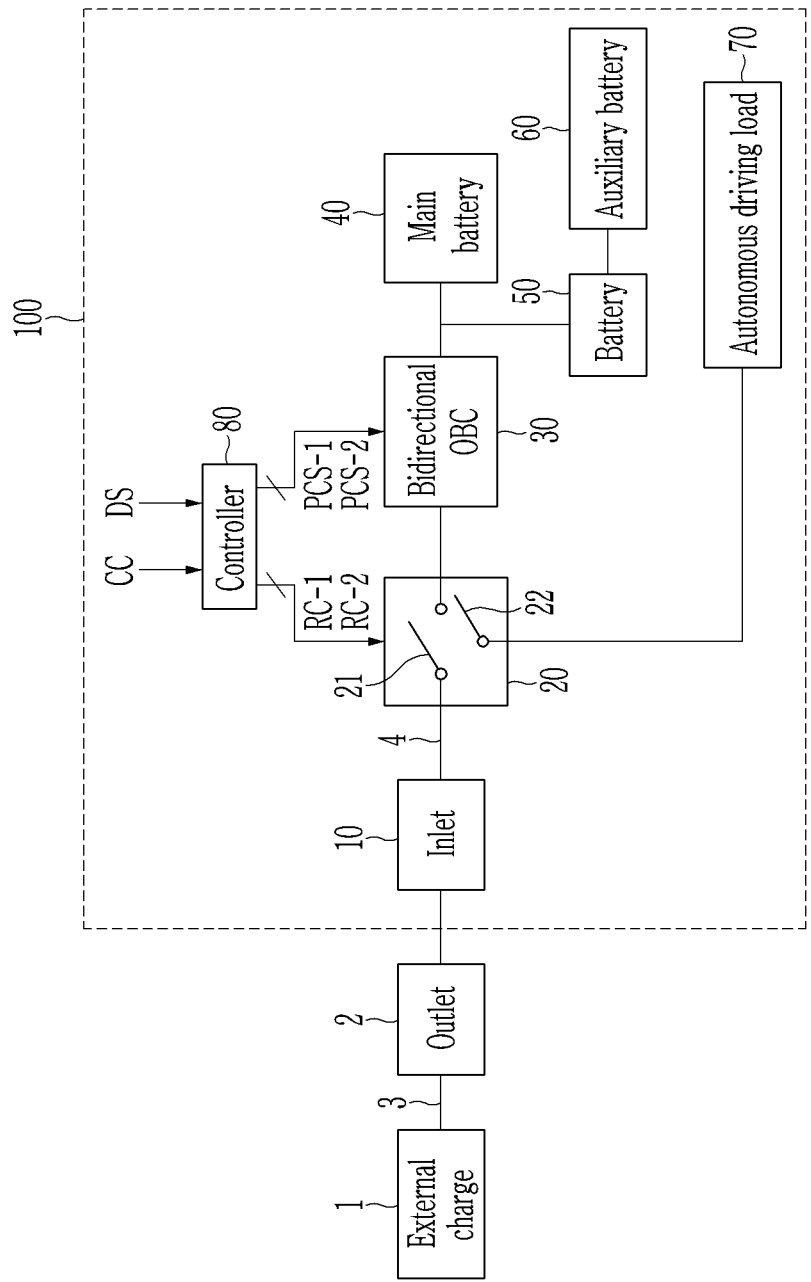
FIG. 1 shows a battery system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms disclosed in the present specification will be described in detail with reference to the accompanying drawings. In the present specification, the same or similar components will be denoted by the same or similar reference numerals, and a repeated description thereof will be omitted. Terms "module" and/or "unit" for components used in the following description are used only in order to easily describe the specification. Therefore, these terms do not have meanings or roles that distinguish them from each other in and of themselves. In describing exemplary forms of the present specification, when it is determined that a detailed description of the well-known art associated with the present disclosure may obscure the gist of the present disclosure, it will be omitted. The accompanying drawings are provided only in order to allow exemplary forms disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or may be connected or coupled to the other component with a further component intervening therebetween. Further, it is to be understood that when one component is referred to as being "directly connected" or "directly coupled" to another component, it may be connected or coupled directly to the other component without a further component intervening therebetween.

It will be further understood that terms "comprise" and "have" used in the present specification specify the presence of stated features, numerals, steps, operations, components, parts, or combinations thereof, but do not preclude the presence or addition of one or more other features, numerals, steps, operations, components, parts, or combinations thereof.

Figure 2A:
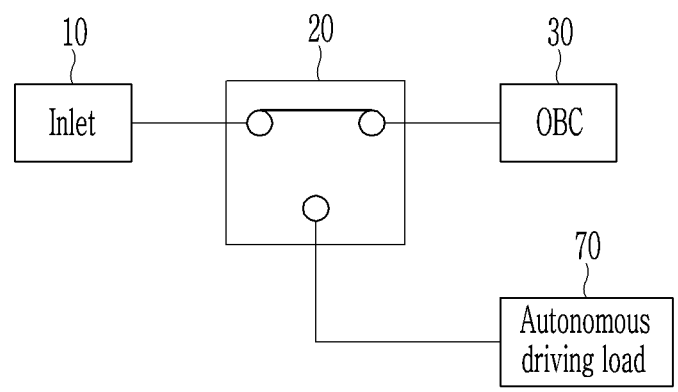
FIG. 2A and FIG. 2B illustrate a variation of a relay in FIG. 1 in one form of the present disclosure.
Figure 2B:
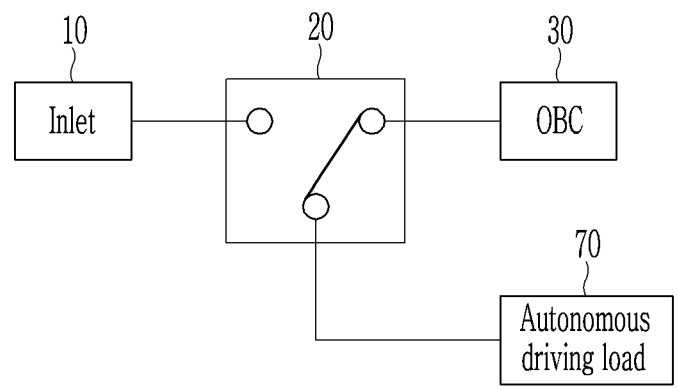

FIG. 1 shows a battery system in some forms of the present disclosure, FIG. 2A and FIG. 2B illustrates a variation of a relay in FIG. 1 in some forms of the present disclosure.

Referring to FIG. 1, a battery system 100 includes an inlet 10, a relay 20, a bidirectional on-board charger (OBC) 30, a main battery 40, low voltage DC-DC converter (LDC) 50, an auxiliary battery 60, an autonomous driving load 70, and a controller 80.

When the inlet 10 is connected to an outlet 2, the inlet 10 is connected to an external charger 1 through an external cable 3. For example, the outlet 2 may include a coupling device (not shown) for coupling the outlet 2 with the inlet 10, and the inlet 10 may include a locking device (not shown) for locking the coupling device of the outlet 2 according to a control signal transmitted from the controller 80. When the locking device of the inlet 10 is in a locked state, the controller 80 may control the vehicle to not start, for example, not to allow power to be transferred to a drive motor.

The relay 20 is switched according to a relay control signal RC received from the controller 80. For example, the relay 20 may interconnect the inlet 10 and the bidirectional OBC 30, thereby to form a charge path. For another example, the relay 20 may interconnect the bidirectional OBC 30 and the autonomous driving load 70, thereby to form a discharge path.

In some forms of the present disclosure, the relay 20 may include a first relay 21 and a second relay 22. For example, referring to FIG. 1, the first relay 21 may electrically connect or disconnect the inlet 10 and the bidirectional OBC 30. The second relay 22 may electrically connect or disconnect the bidirectional OBC 30 and the autonomous driving load 70.

In some forms of the present disclosure, the relay 20 may be configured as a single switch including a first contact point and a second contact point. For example, referring to FIG. 2A and FIG. 2B, the relay 20 may be configured as a single switch (e.g., a single pole double through (SPDT) switch) including a circuit that selectively turns on and off two electrical connection terminals (contact points). At this time, the relay 20 may selectively switch, an electrical connection between the inlet 10 and the bidirectional OBC 30, or an electrical connection between the autonomous driving load 70 and the bidirectional OBC 30. At this time, FIG. 2A is an example of the connection state of the relay 20 in the charging mode, and FIG. 2B is an example of the relay 20 in the discharge mode.

Hereinafter, changing the relay 20 from open state to closed state is called "turn on", and changing the relay 20 from closed state to open state is called "turn off". Turn on and off is collectively called "switching".

The bidirectional OBC 30 includes an AC-DC and DC-DC bidirectional power conversion topology, and transfers electric power for charge or discharge according to a power control signal PCS transferred from the controller 80. The controller 80 may generate the power control signal PCS for controlling a direction of the power transfer of the bidirectional OBC 30 and a power transfer amount. A first end of the bidirectional OBC 30 is connected to the main battery 40, and a second end of the bidirectional OBC 30 may be selectively connected to the inlet 10 or the autonomous driving load 70 through the relay 20.

For example, in the charging mode for charging the main battery 40 by the electrical power supplied form the external charger 1, the electrical power is supplied to the main battery 40 through the charge path. At this time, the charge path may include, the inlet 10 connected to the external charger 1 through the outlet 2, the bidirectional OBC 30, and the main battery 40. The bidirectional OBC 30 may convert an AC power supplied form the external charger 1 to a DC power according to an AC-DC power control signal PCS_1 transferred from the controller 80, and supply the converted power to the main battery 40 for charging.

For another example, in the discharge mode for supplying a power discharged from the main battery 40 to the autonomous driving load 70, the electrical power is supplied to the autonomous driving load 70 through the discharge path. At this time, the discharge path may include, the main battery 40, the bidirectional OBC 30, and the autonomous driving load 70. The bidirectional OBC 30 may convert a high voltage DC power discharged from the main battery 40 to a low voltage DC power appropriate for the autonomous driving load 70 according to the DC-DC power control signal PCS_2 transferred from the controller 80, and supply the converted power to the autonomous driving load 70.

Then, a separate component part, for example, a secondary LDC connected between the main battery 40 and the autonomous driving load 70, conventionally employed for convert a high voltage DC power discharged from the main battery 40 to a low voltage DC power and to supply the converted power to the autonomous driving load 70 may be removed, thereby achieving reduction in cost and vehicle weight. At this time, a first LDC may correspond to the LDC shown in FIG. 3.

The main battery 40 may be configured as a plurality of battery cell (not shown) modules that are electrically connected in series/in parallel. The quantity of battery cells employed in the main battery 40 may be appropriately set, for example, appropriately for supplying power to a drive motor of the vehicle. In addition, the main battery 40 may be configured by a plurality of battery packs connected in series or in parallel, where each battery pack is formed as a plurality of battery cells connected in series. That is, the quantity of battery packs, the quantity of battery cells, and connection relationship thereof, in the battery module may be appropriately designed in consideration of required electrical load.

The LDC 50 converts the high voltage power to the low voltage power, to charge the auxiliary battery 60. For example, in the charging mode, the LDC 50 may convert the high voltage power supplied form the bidirectional OBC 30 to the low voltage power, to charge the auxiliary battery 60. For another example, in the discharge mode, the LDC 50 may convert the high voltage power supplied form the main battery 40 to the low voltage power, to charge the auxiliary battery 60.

The auxiliary battery 60 may supply power to the electrical component load of the vehicle by being electrically connected. For example, the auxiliary battery 60 may be charged, through the LDC 50, by electrical power supplied from the bidirectional OBC 30 or the main battery 40. At this time, the electrical component load may include, water pump, air-conditioning system, direction indicator, head lamp, window brush, and the like, for providing driver's convenience in a normal driving mode of an electric vehicle or hybrid vehicle, but is not limited thereto.

The autonomous driving load 70 includes, various electrical component load for providing driver's convenience in an autonomous driving mode of the electric vehicle or hybrid vehicle. For example, the autonomous driving load 70 may include, sensors requiring high computing power, an electrically assisted power steering, and the like. Conventionally, a separate LDC has been typically employed for supplying sufficient power for the autonomous driving load 70. However, in some forms of the present disclosure, the autonomous driving load 70 is supplied power by controlling switching of the relay 20 interconnecting the autonomous driving load 70 and the bidirectional OBC 30, thereby without a separate LDC.

The controller 80 determine the charging mode or the discharge mode of the vehicle, and transfers a control signal to the relay 20 and the bidirectional OBC 30, to charge the main battery 40 or to supply power to the autonomous driving load 70.

FIG. 1 to FIG. 4 illustrate the controller 80 as an independent device, but is not limited thereto. The controller may be installed in the bidirectional OBC 30, or may be implemented as a control system such as a vehicle charging management system (VCMS).

Figure 3:
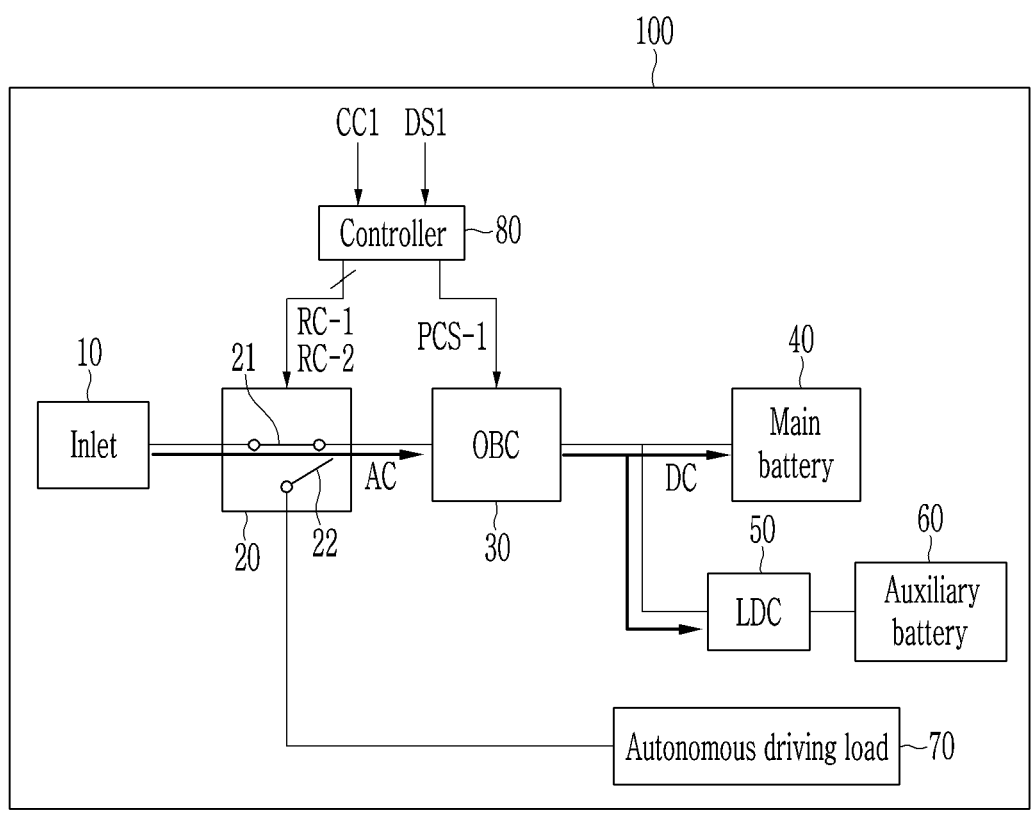
FIG. 3 illustrates a power transfer path in a charging mode in one form of the present disclosure.

FIG. 3 illustrates a power transfer path in the charging mode in some forms of the present disclosure.

Figure 4:
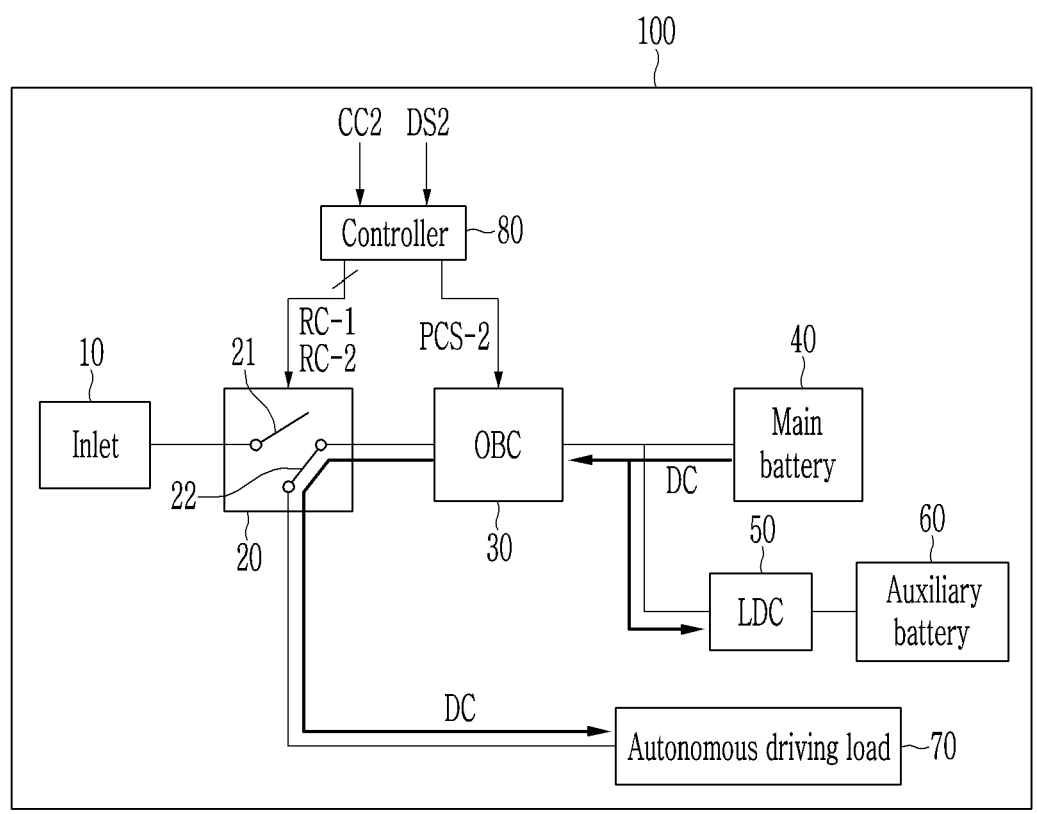
FIG. 4 illustrates a power transfer path in a discharge mode in one form of the present disclosure.

FIG. 4 illustrates a power transfer path in the discharge mode in some forms of the present disclosure.

Figure 5:
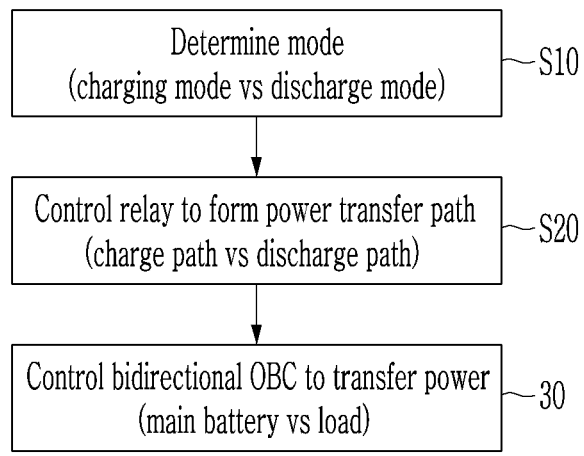
FIG. 5 is a flowchart showing a battery control method in one form of the present disclosure.

FIG. 5 is a flowchart showing a battery control method in some forms of the present disclosure.

Hereinafter, a battery control method and a battery system enabling the battery control method in some forms of the present disclosure is described in detail with reference to FIG. 1 to FIG. 5.

First, at step S10, the controller 80 determines the charging mode or the discharge mode of the electric vehicle based on an inlet state signal CC and a key state signal DS.

The inlet state signal CC may be transferred from a sensor (not shown) that detects a connected state or disconnected state between the inlet 10 and the outlet 2. The key state signal DS may be transferred from a sensor (not shown) that detects whether the vehicle is turned on.

When a connection signal CC1 of the inlet 10 and a key-off signal DS1 are received, the controller 80 may determine the charging mode of the main battery When a disconnection signal CC2 of the inlet 10 and a key-on signal DS2 are received, the controller 80 may determine the discharge mode of the main battery. For example, the key-on signal DS2 is a signal indicating that the vehicle is turned on, for example, ready to move, i.e., ready to supply power to a drive motor, and the key-off signal DS1 is a signal indicating that the vehicle is turned off.

The term key used in the key-on and key-off signal should not be interpreted to mean that an actual key is necessarily used. The vehicle may be turned on and off by various other schemes, such as a push button, a mobile device authentication, and the like.

Subsequently at step S20, the controller 80 controls switching of the relay 20 depending on the charging mode or the discharge mode, to form a power transfer path, that is, the charge path or the discharge path.

Referring to FIG. 3, when the inlet 10 is connected to the external charger 1 through the outlet 2 and the vehicle is turned off to enter the charging mode, the controller 80 may form the charge path by transferring an on-level relay control signal RC_1 to the first relay 21 positioned between the inlet 10 and the second end of the bidirectional OBC 30 and transferring an off-level control signal RC_2 to the second relay 22 positioned between the autonomous driving load 70 and the second end of the bidirectional OBC 30.

In some forms of the present disclosure, upon entering the charging mode, the controller 80 may form the charge path by controlling the relay 20 to electrically connect the inlet 10 and the bidirectional OBC 30. At this time, the relay 20 may be configured as a single switch (e.g., a single pole double through (SPDT) switch) including a circuit that selectively turns on and off two electrical connection terminals (contact points).

Referring to FIG. 4, when the inlet 10 is disconnected from the external charger 1 through the outlet 2 and the vehicle is turned off to enter the discharge mode, the controller 80 may form the discharge path by transferring the off-level relay control signal RC_1 to the first relay 21 positioned between the inlet 10 and the second end of the bidirectional OBC 30 and transferring the on-level control signal RC_2 to the second relay 22 positioned between the autonomous driving load 70 and the second end of the bidirectional OBC 30.

For another example, upon entering the discharge mode, the controller 80 may form the discharge path by controlling the relay 20 to electrically connect the autonomous driving load 70 and the bidirectional OBC 30. At this time, the relay 20 may be configured as a single switch (e.g., a single pole double through (SPDT) switch) including a circuit that selectively turns on and off two electrical connection terminals (contact points).

Subsequently at step S30, the controller 80 transfers an electric power control the signal PCS to the bidirectional OBC 30, to supply power to the main battery 40 or the autonomous driving load 70.

Referring to FIG. 3, in the charging mode, the controller 80 may transfer the AC-DC power control signal PCS_1 to the bidirectional OBC 30 such that the AC power supplied form the external charger 1 may be converted to the DC power to charge the main battery 40. At this time, the AC-DC power control signal PCS_1 may include information on an amount of power to be converted Referring to FIG. 4, in the discharge mode, the controller 80 may transfer the DC-DC power control signal PCS_2 to the bidirectional OBC 30 such that the high voltage DC power discharged from the main battery 40 may be converted to the low voltage DC power appropriate for the autonomous driving load 70 and supplied to the autonomous driving load 70. At this time, the DC-DC power control signal PCS_2 may include information on an amount of power to be converted While this disclosure has been described in connection with what is presently considered to be practical exemplary forms, it is to be understood that the disclosure is not limited to the disclosed forms. On the contrary, it is intended to cover various modifications and equivalent arrangements included within the spirit and scope of the appended claims.

What is claimed is:

1. A battery system, comprising:
    a main battery;
    an inlet connected to an external charger through an outlet;
    a bidirectional on-board charger (OBC) configured to:
        in a charging mode, convert an alternating current (AC) power supplied from the external charger through the inlet to a direct current (DC) power to charge the main battery;
        in a discharge mode, convert a high voltage DC power discharged from the main battery to a low voltage DC power to supply the converted power to a load;
    a relay comprising a single pole double through (SPDT) circuit configured to switch an electrical connection between the bidirectional OBC and the inlet, or to switch an electrical connection between the bidirectional OBC and the load; and
    a controller configured to:
        in the charging mode, transfer, to the bidirectional OBC, an AC-DC power control signal instructing conversion from the AC power to the DC power; and
        in the discharge mode, transfer, to the bidirectional OBC, a DC-DC power control signal instructing conversion from the high voltage DC power to the low voltage DC power;
    wherein the controller is further configured to:
        determine to operate in the charging mode when a connection signal of the inlet and a key-off signal are received; and
        determine to operate in the discharge mode when a disconnection signal of the inlet and a key-on signal are received.

2. The battery system of claim 1, wherein the controller is configured to:
    form a charge path in the charging mode, by transferring, to the first relay, an on-level relay control signal and transferring, to the second relay, an off-level relay control signal.

3. The battery system of claim 2, wherein the controller is configured to:
    form a discharge path in the discharge mode, by transferring, to the first relay, the off-level relay control signal and transferring, to the second relay, the on-level relay control signal.

4. The battery system of claim 1, wherein the controller is configured to:
    form the charge path, by transferring, to the relay, a control signal for controlling an electrical connection between the bidirectional OBC and the inlet.

5. The battery system of claim 4, wherein the controller is configured to:
    form the discharge path, by transferring, to the relay, a control signal for controlling an electrical connection between the bidirectional OBC and the load.

\* \* \* \* \*